(12) United States Patent
Lienr, Jr.

(10) Patent No.: US 7,891,741 B2
(45) Date of Patent: Feb. 22, 2011

(54) CRISS-CROSS HARNESS SYSTEM FOR USE WITH SEATS

(76) Inventor: Peter Albert Helmut Lienr, Jr., 48 Marland Rd., Colorado Springs, CO (US) 80906

( * ) Notice: Subject to any disclaimer, the term of this patent is extended or adjusted under 35 U.S.C. 154(b) by 38 days.

(21) Appl. No.: 12/234,267

(22) Filed: Sep. 19, 2008

(65) Prior Publication Data
US 2009/0079252 A1    Mar. 26, 2009

Related U.S. Application Data

(63) Continuation of application No. 60/974,033, filed on Sep. 20, 2007.

(51) Int. Cl.
*A62B 35/00* (2006.01)

(52) U.S. Cl. .................. 297/485; 297/464; 297/466; 297/467; 297/468; 297/484

(58) Field of Classification Search ............... 297/467, 297/468, 469, 484, 464, 465, 466, 485; 24/712.1, 24/712.2, 712.5, 712.6
See application file for complete search history.

(56) References Cited

U.S. PATENT DOCUMENTS

| | | | | |
|---|---|---|---|---|
| 951,560 | A | * | 3/1910 | Eaton ..................... 297/484 X |
| 2,312,946 | A | * | 3/1943 | Watter ........................ 297/484 |
| 2,365,625 | A | * | 12/1944 | Carlisle ..................... 297/484 |
| 2,394,523 | A | * | 2/1946 | Pancoe .................... 297/484 X |
| 2,437,585 | A | * | 3/1948 | Zimmern .................... 297/468 |
| 2,823,046 | A | * | 2/1958 | Banta ......................... 297/471 |
| 3,162,485 | A | * | 12/1964 | Pragnell ..................... 297/484 |
| 3,454,304 | A | * | 7/1969 | Hudak ........................ 297/484 |
| 3,604,750 | A | * | 9/1971 | Doering ..................... 297/467 |
| 3,694,029 | A | * | 9/1972 | Noble et al. ................ 297/467 |
| 3,834,758 | A | * | 9/1974 | Soule ......................... 297/484 |
| 4,231,616 | A | * | 11/1980 | Painter ................... 297/484 X |
| 4,330,152 | A | * | 5/1982 | Legan et al. ................ 297/465 |
| 4,396,228 | A | * | 8/1983 | Go ............................. 297/484 |
| 4,540,218 | A | * | 9/1985 | Thomas ..................... 297/467 |
| 4,874,203 | A | * | 10/1989 | Henley ................... 297/485 X |
| 5,074,588 | A | * | 12/1991 | Huspen .................. 297/484 X |
| 5,496,092 | A | * | 3/1996 | Williams et al. ........ 297/464 X |
| 6,390,345 | B1 | * | 5/2002 | Brown et al. ........... 297/485 X |

(Continued)

FOREIGN PATENT DOCUMENTS

DE    3445497 A1 *  6/1986

(Continued)

*Primary Examiner*—Rodney B White
*Assistant Examiner*—Joseph Edell
(74) *Attorney, Agent, or Firm*—Luis M. Ortiz; Kermit D. Lopez; Ortiz & Lopez, PLLC

(57) ABSTRACT

A Criss-Cross harness system with a single strap mechanism that can be threaded through guides formed along a seat to allow restraint of an infant in a seat. The strap can be held behind the seat by a quick release mechanism that can also be disengaged by pressing a single button or squeezing two handles/paddles together. When a passenger attempts to pull on the strap to remove the area of the body held down, the entire strap mechanism gets re-tightened, thereby holding the securely in the seat. The Criss-Cross harness system can be used with a high chair, a stroller, a swing, a race car, airplane cockpit, amusement park ride, wheel chair.

17 Claims, 3 Drawing Sheets

U.S. PATENT DOCUMENTS

| | | | |
|---|---|---|---|
| 7,118,180 B1 * | 10/2006 | Tanaka et al. | 297/485 |
| 7,347,494 B2 * | 3/2008 | Boyle et al. | 297/467 X |
| 7,488,038 B2 * | 2/2009 | Boyle et al. | 297/484 X |
| 7,510,246 B2 * | 3/2009 | Gruninger | 297/485 |
| 7,766,422 B2 * | 8/2010 | Edwards et al. | 297/485 X |
| 7,770,969 B2 * | 8/2010 | Boyle et al. | 297/484 X |
| 2003/0173817 A1 * | 9/2003 | Vits et al. | 297/484 |
| 2006/0163936 A1 * | 7/2006 | Millard | 297/466 |
| 2007/0246927 A1 * | 10/2007 | Okada | 297/484 X |

FOREIGN PATENT DOCUMENTS

| | | |
|---|---|---|
| DE | 3636203 A1 * | 5/1988 |
| EP | 287259 A2 * | 10/1988 |
| WO | WO 8602050 A1 * | 4/1986 |

* cited by examiner

CRISS-CROSS HARNESS SYSTEM FOR USE WITH SEATS

RELATED APPLICATION AND PRIORITY

The present application is a continuation of provisional patent application Ser. No. 60/974,033 entitled "Criss-Cross Harness System for use with Child Seats", filed Sep. 20, 2007, the specification of which is hereby incorporated by reference herein in its entirety.

TECHNICAL FIELD

Embodiments are generally related to safety restraints, devices and methods. Embodiments are also related to devices and methods for a restraint criss-cross harness system with a single strap restraint mechanism.

BACKGROUND OF THE INVENTION

Restraint systems for moving vehicles are well known in a diversity of shapes and designs for both passenger use (e.g., child and infant seats and restraint systems). A typical safety seat for a child has a crotch belt to which is attached a buckle that receives either a single tongue connected with a pair of shoulder belts or a pair of tongues connected with a pair of shoulder belts. In order to retain the child securely in the seat, the pair of shoulder belts are interconnected to form a chest harness, which is maintained against the shoulders of the child. Race car driver and pilot restraint system are similar to child restraints in their double shoulder, leg and crotch strap locations as a means of providing restraint. Although child restraint system will be discussed in more detail herein, this discussion is not meant to limit the scope and application of the present inventors disclosure to only child restraint-related systems.

One type of restraining harness used for restraining children includes a jacket-type arrangement wherein the child must be put into the jacket, and the jacket includes fastening means connected to the seat or the bus in a permanent manner as by anchoring straps to the floor of the school bus. This type arrangement is costly to use and requires that one size jacket be used in winter when the child wears a coat and another in summer when the child wears no coat.

One prior art illustrates a safety belt and harness system, which includes means for securing a strap to the seat and has hook and loop type fastening means for the belt, which may be positioned in one of two locations. This enables the belt to be secured around the waist or chest of the user; however, it does not permit chest and waist use, and more importantly, it does not permit a wide range of adjustable locations necessary in dealing with children of various sizes and for later unauthorized use.

Another prior art includes convertible infant car seats employing a shield attachment, which pivots to a position in front of the infant to provide a safety barrier for the child's upper body upon impact and adequately confine the infant into the appropriate seat pocket position. The shield also provides a convenient surface to support the child's hands. Most of the prior art devices shows harnesses or restrainers designed for specific purposes, but none has the flexibility and adjustability to use in all forms of child seats including high chairs, strollers swings and the like. Hence it is desirable to have a harness system that can be utilized in all forms of child seats and allows for a more secure restraint system.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide devices and methods for seat restraints.

It is another aspect of the present invention to provide a crisscross harness restraint system with a single strap mechanism.

It is a further aspect of the present invention to provide a harness system that can be utilized in all forms of seating restraints and allows for a more secure restraint system.

The aforementioned aspects and other objectives and advantages can now be achieved as described herein. The present invention includes a Criss-Cross harness system with a single strap mechanism that can be threaded through guides formed along a seat to allow restraint of a passenger in a seat. The strap can be held behind the child seat by a clamp that can also be disengaged by pressing a single button or squeezing two handles/paddles together. If a passenger (e.g., a child) attempts to pull on the strap to remove the area of the body held down, the entire strap mechanism will be tightened thereby holding the passenger secure. In the event of an emergency rapid extrication of the infant can also be performed.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1B:
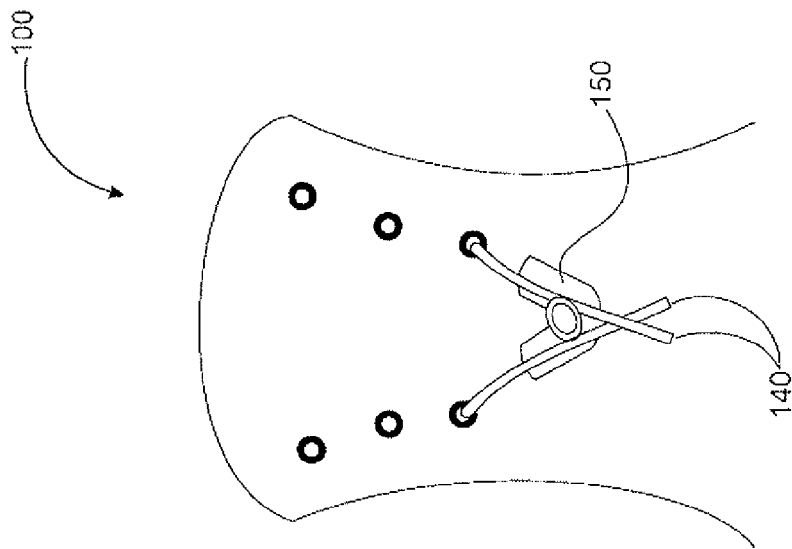
FIG. 1B illustrates the back view of the seat of FIG. 1A, which can be implemented in accordance with the present invention.
Figure 1A:
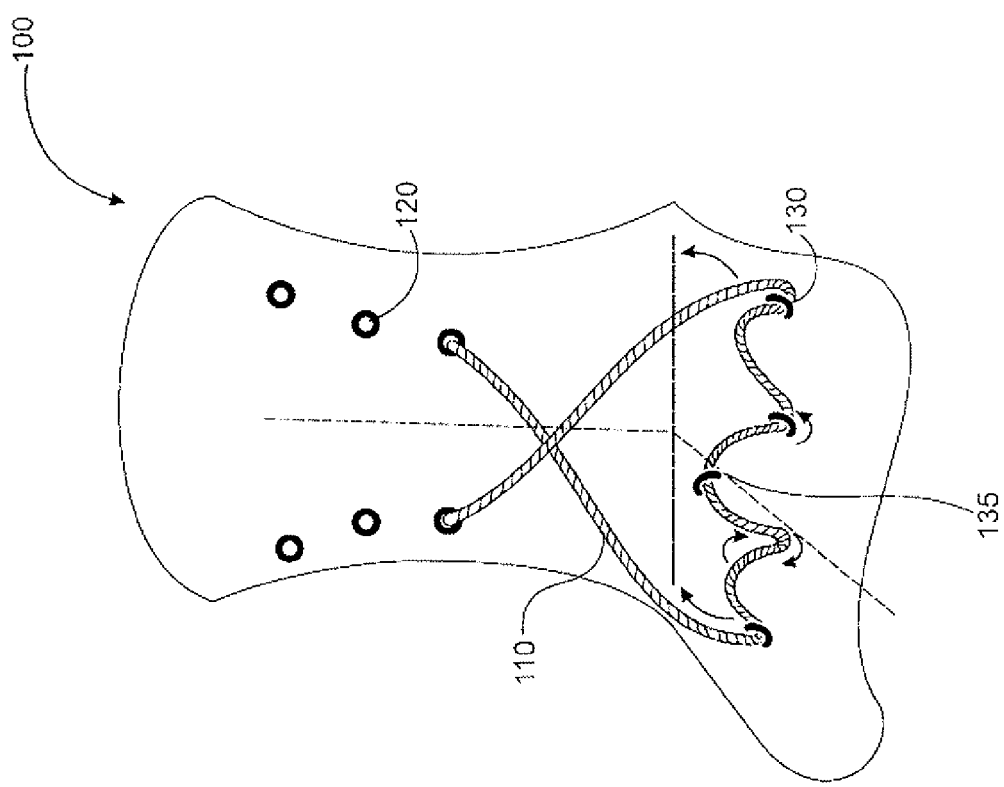
FIG. 1A illustrates the front view of a seat wherein a single strap is threaded along through holes or loops formed on the seat which can be implemented in accordance with the present invention

FIG. 1A illustrates the front view of a child car seat 100 including a back area and a seat area wherein a single strap can be threaded through holes in the back area and loops formed on the seat area, which can be implemented in accordance with the present invention. The Criss-Cross harness system on the child car seat 100 includes a single strap 110 that can be passed through holes 120 in the back area of the child car seat and threaded through loops 130 formed along the seat area of the child car seat 100 to allow restraint of an infant in a seat. When a child attempts to pull on the strap 110 to remove the area of the body held down the entire mechanism can tighten thereby holding the child secure.

FIG. 1A illustrates the front view of a child car seat 100 wherein a single strap can be threaded through holes or loops formed on the seat, which can be implemented in accordance with the present invention. The Criss-Cross harness system on the child car seat 100 includes a single strap 110 that can be passed through holes 120 and threaded through loops 130 formed along the child car seat 100 to allow restraint of an infant in a seat. When a child attempts to pull on the strap 110 to remove the area of the body held down the entire mechanism can tighten thereby holding the child secure.

FIG. 1B illustrates the back view of the child car seat of FIG. 1A, which can be implemented in accordance with the present invention. The strap ends 140 can be retained behind the child seat 100 by a single retaining device 150. In the event of an emergency rapid extrication of the infant can be performed by disengaging the retaining device 150 on the back with one hand and rapidly pulling the center pull 135 (FIG. 1A) of the strap 110 with other. This action can remove the strap 110 completely from the seat 100 allowing the infant to be removed and first aid to be administered immediately. An emergency can be any situation that demands rapid extrication of the child from the seat, and highly targeted towards children that are restrained and choking.

Figure 2B:
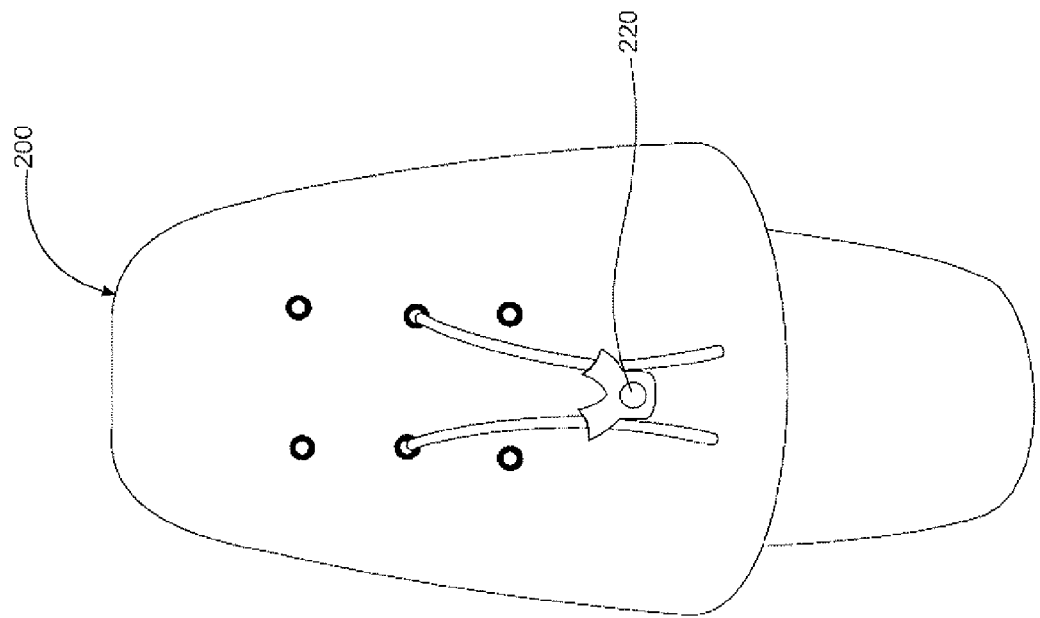
FIG. 2B illustrates the back view of a chair of FIG. 2A, which can be implemented in accordance with another embodiment the present invention.
Figure 2A:
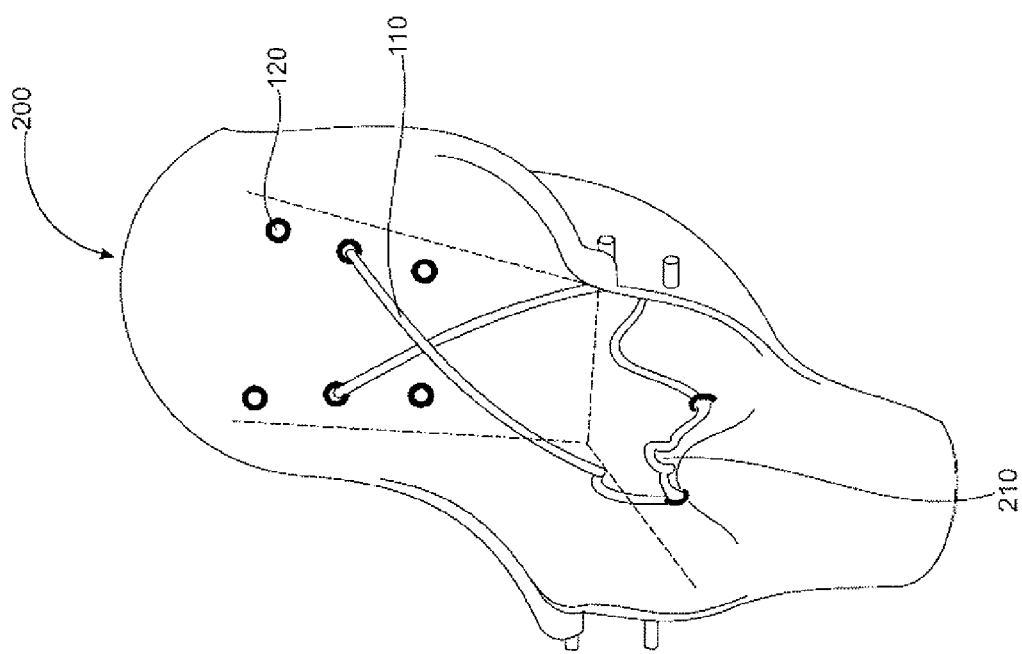
FIG. 2A illustrates the front view of a chair, which can be implemented in accordance with another embodiment the present invention.

FIG. 2A illustrates the front view of a child high chair, which can be implemented in accordance with another embodiment of the present invention. Note that in FIGS. 1-4, identical or similar parts or elements are indicated by identical reference numerals. The child high chair 200 includes a single strap 110 that can be passed through holes 120 and threaded through loops 130 formed along the child high chair 200 to allow restraint of an infant in a seat. The emergency pull hole 210 can be utilized in the event of an emergency.

FIG. 2B illustrates the back view of a child high chair 200 of FIG. 2A, which can be implemented in accordance with another embodiment of the present invention. The child high chair 200 includes a single push button release clamp 220 to retain both single strap ends 140.

Figure 3B:
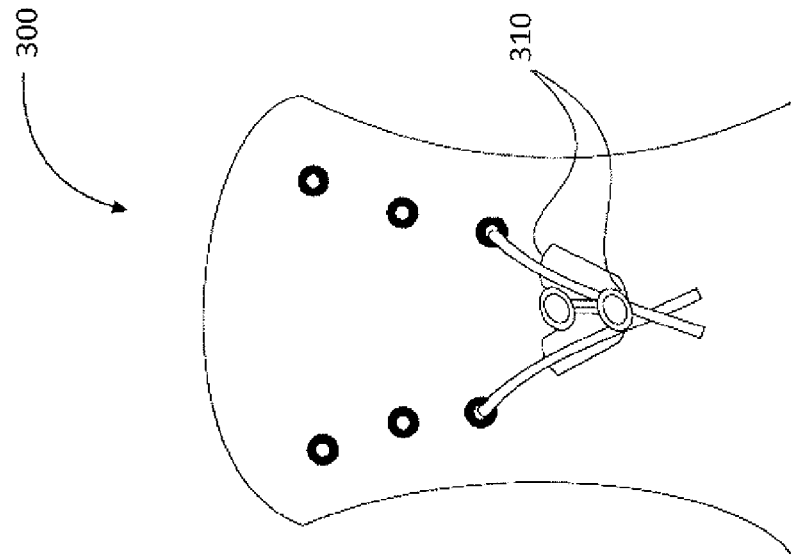
FIG. 3B illustrates the back view of a child seat of FIG. 3A, which can be implemented in accordance with another embodiment the present invention.
Figure 3A:
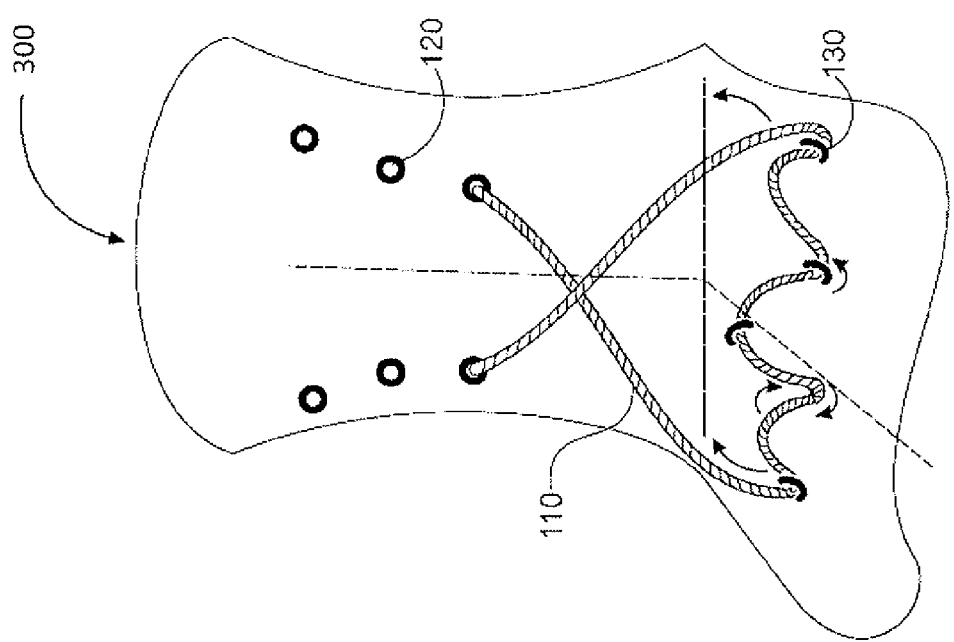
FIG. 3A illustrates the front view of a child seat with an alternate quick release system, which can be implemented in accordance with another embodiment the present invention.

FIG. 3A illustrates the front view of a child seat with an alternate quick release system, which can be implemented in accordance with another embodiment the present invention. The Criss-Cross harness system on the child seat 300 includes a single strap 110 that can be passed through holes 120 and threaded through loops 130 formed along the child seat 300 to allow restraint of an infant in a seat as described in FIG. 1.

FIG. 3B illustrates the back view of a child seat of FIG. 3A, which can be implemented in accordance with another embodiment the present invention. Here the Criss-Cross harness system on the child seat 300 can be provided with an alternative quick release requiring squeezing of two handles/bars 310 to release the single strap. Alternatively wider straps made of stiff nylon can also be employed and gel pad can be utilized instead of cushion.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A seat restraint system, comprising:
a seat having loops formed on a seat area of the seat and holes formed in and along sides of a back area of the seat;
a strap including two ends adapted to be threaded through the loops formed on a seat area of the seat and holes formed along the sides of the back area of the seat; and
a quick release mechanism located behind the seat back securely holding the two ends of the strap and securing a passenger sitting in the seat wherein the quick release mechanism is adapted to rapidly release the two ends of the strap for removal of the passenger from the seat by activation of at least one of:
pressing a single button on said quick release mechanism, squeezing of two handles on said quick release mechanism.

2. The seat restraint system of claim 1, wherein said seat includes at least one of: a high chair, a stroller, a swing, a race car, airplane cockpit, amusement park ride, wheelchair.

3. The seat restraint system of claim 1, wherein said seat is securely held to a seat located beneath and behind said seat.

4. A seat restraint system, comprising:
a seat having a back, front and two sides, said seat including loops formed on a seat area of the seat and holes formed in and along sides of the back of the seat;
a strap including two ends threaded through the loops and holes to hold a passengers legs and hips onto the seat area of the seat and criss-cross over the passenger's chest to hold the passenger's torso against the back area of the seat; and
a quick release mechanism adapted to rapidly release said strap from a tightened position at the front of said seat for removal of the passenger from the seat.

5. The seat restraint system of claim 4, said quick release mechanism further comprising a button, wherein said strap is rapidly released from a tightened position at the front of said seat by pressing said button.

6. The seat restraint system of claim 5, wherein said seat includes at least one of: a high chair, a stroller, a swing, a race car, airplane cockpit, amusement park ride, wheelchair.

7. The child seat restraint system of claim 5, wherein said child seat is securely held to a seat located beneath and behind said child seat.

8. The seat restraint system of claim 4, said quick release mechanism further comprising two handles, wherein said single strap is rapidly released from a tightened position at the front of said child seat by squeezing said two handles.

9. The seat restraint system of claim 8, wherein said seat includes at least one of: a high chair, a stroller, a swing, a race car, airplane cockpit, amusement park ride, wheel chair.

10. The seat restraint system of claim 8, wherein said seat is securely held to a seat located beneath and behind said seat.

11. The seat restraint system of claim 8, wherein said restraining harness system is adapted to become re-tightened when and if a passenger attempts to loosen said strap.

12. The seat restraint system of claim 4, wherein said seat includes at least one of: a high chair, a stroller, a swing, a race car, airplane cockpit, amusement park ride, wheelchair.

13. The seat restraint system of claim 4, wherein said seat is securely held to a seat located beneath and behind said seat.

14. A method of utilizing a restraining harness system in a seat for quick release and extraction of a passenger in case of an emergency, comprising:
threading a single strap including two ends through loops formed on a seat area of the seat and holes formed in and along a back area of the seat; and
holding the two ends of the single strap securely behind the back area of the seat with a retaining device including a quick release mechanism, said single quick release mechanism releasing the single strap by at least one of squeezing two handles located on the quick release mechanism or pressing a button located on the quick release mechanism for rapid access to a passenger retained within said seat by the single strap.

15. A method of claim 14 wherein said seat can include a high chair, a stroller, a swing, a race car, airplane cockpit, amusement park ride, wheelchair.

16. A method of claim 14 wherein said strap of said restraining harness system can become re-tightened by said quick release mechanism when and if a passenger attempts to pull it the strap loose.

17. A method of claim 14 wherein rapid extrication can be carried out by disengaging said quick release mechanism with one hand while rapidly pulling the center of said strap with another hand.

* * * * *

UNITED STATES PATENT AND TRADEMARK OFFICE
CERTIFICATE OF CORRECTION

| | | |
|---|---|---|
| PATENT NO. | : 7,891,741 B2 | Page 1 of 1 |
| APPLICATION NO. | : 12/234267 | |
| DATED | : February 22, 2011 | |
| INVENTOR(S) | : Peter Albert Helmut Liehr, Jr. | |

It is certified that error appears in the above-identified patent and that said Letters Patent is hereby corrected as shown below:

On the Title Page:
Item [76] Inventor: Please delete "Lienr" and insert therefore --Liehr--.

Signed and Sealed this
Fifth Day of April, 2011

David J. Kappos
*Director of the United States Patent and Trademark Office*